May 21, 1935.　　　N. T. A. NILSSON　　　2,002,041
FLEA BEETLE CATCHER
Filed July 17, 1934　　　2 Sheets-Sheet 1
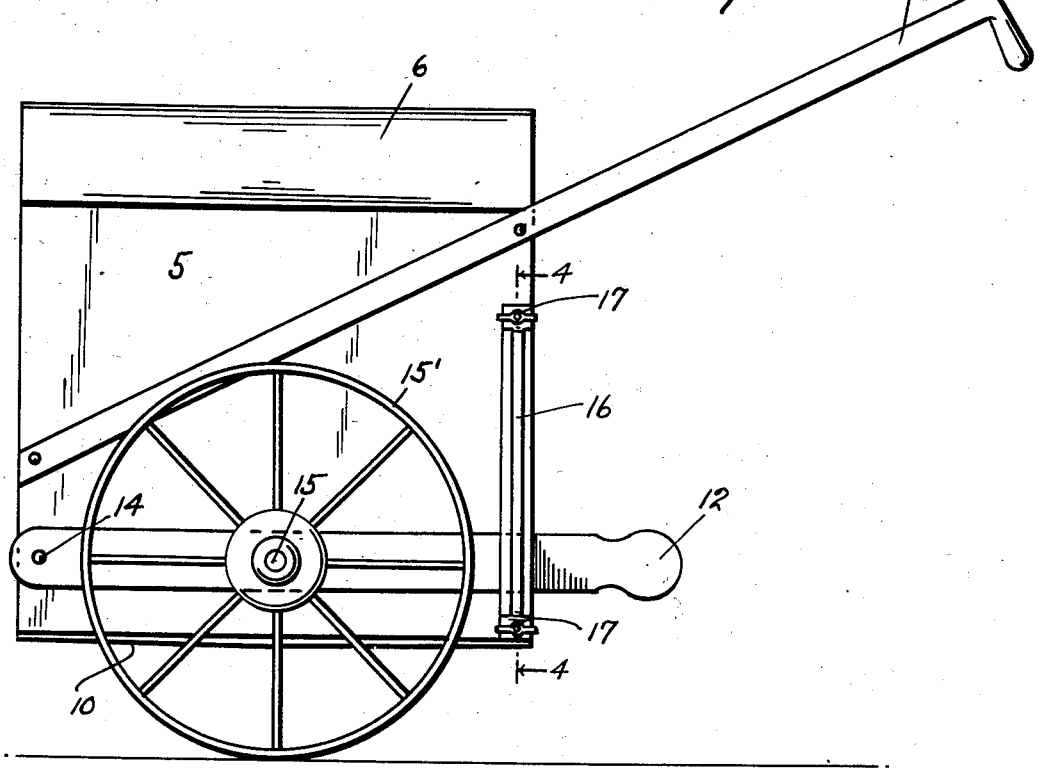
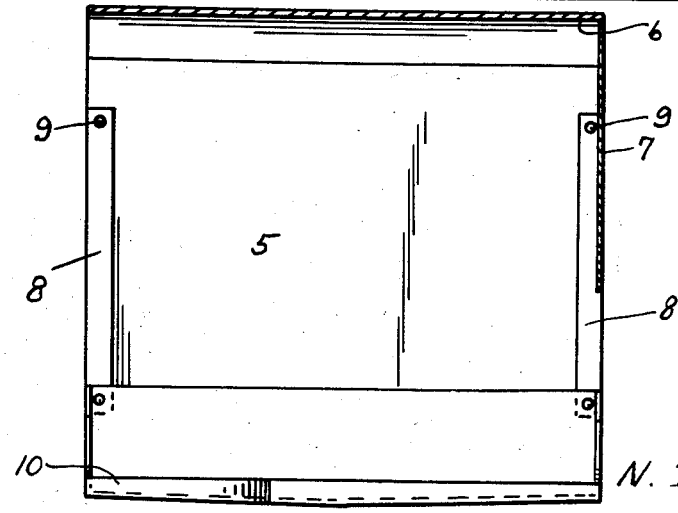
Inventor
N. T. A. Nilsson
By Clarence A. O'Brien
Attorney

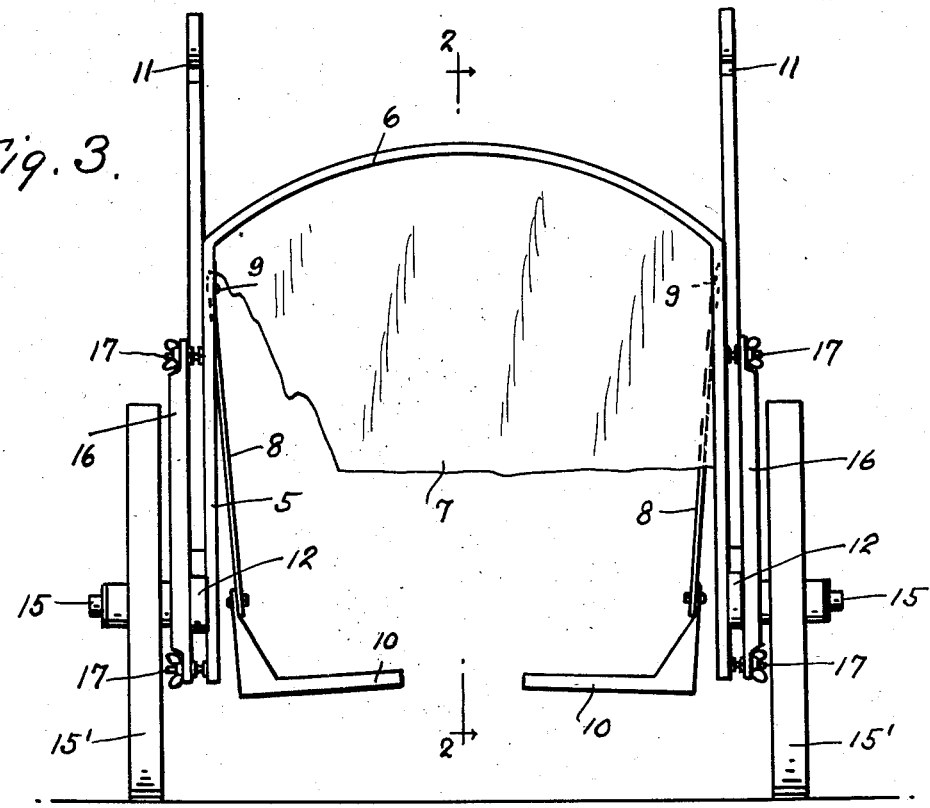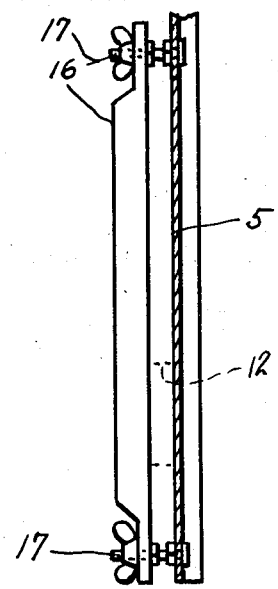

Patented May 21, 1935

2,002,041

UNITED STATES PATENT OFFICE 2,002,041

FLEA BEETLE CATCHER

Nils T. A. Nilsson, Elma, Wash.

Application July 17, 1934, Serial No. 735,695

2 Claims. (Cl. 43—133)

In many parts of the United States, what is known as the potato beetle, at a certain stage in the life of the potato plant, is a sort of flea beetle, and attacks the potato plant, finally becoming a boring insect or beetle and gets down into the potato, and after eating the leaves of the potato, bores about half an inch into the potato, where it lays eggs, and the eggs form into larvæ, and the larvæ into a fly or flea beetle, and then the whole cycle is repeated.

The purpose of the present invention is to provide a wheeled mechanism for catching these flea beetles.

Another important object of the invention resides in the provision of a catcher of this nature which is simple in its construction, inexpensive to manufacture, easy to operate, adjustable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a side elevation of the machine embodying the features of my invention.

Figure 2 is a vertical longitudinal section therethrough taken substantially on the line 2—2 of Figure 3.

Figure 3 is a rear elevation thereof, and

Figure 4 is a detail section taken substantially on the line 4—4 of Figure 1.

Referring to the drawings in detail it will be seen that the frame or body comprises a pair of spaced upright side plates 5 the upper ends of which merge into an arcuate hood 6. From the rear edge of the hood depends a canvas flap 7. Spring arms 8 are riveted or otherwise secured as at 9 to the inner faces of the sides 5 to diverge downwardly therefrom. Pans or trays 10 are secured to the lower ends of the spring arms and are tensioned inwardly. These pans are adapted to contain oil.

Handle bars 11 are secured diagonally to the outer faces of the sides 5 so as to incline upwardly and rearwardly and to extend rearwardly therefrom. Numerals 12 denote bars pivoted as at 14 to the sides 5 outwardly thereof and adjacent the forward edges thereof and adjacent the bottoms thereof.

Stub axles 15 project outwardly from intermediate portions of the bars and have wheels 16 journalled thereon. Obviously by swinging the bars up and down the distance of the trays 10 from the ground may be varied in accordance with the height of the potato plant. In order to hold the bars in adjusted positions I provide elongated clamping members 16 held in place adjustably by thumb nuts and bolts 17 on the rear portions of the sides 5.

This machine is pushed along so as to straddle a row of potato plants. The canvas flap prevents the beetles from jumping out. The oil pans are set relatively close to the ground and as the vehicle is pushed along, it disturbs the vines and the beetles or fleas jump off the plants and fall into the oil.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A machine of the class described comprising a pair of upright side plates, a hood connecting the upper edges of the plates, a pair of spring arms fixed to each plate on the inner face thereof and diverging downwardly therefrom, oil pans mounted on the lower ends of the arms, and wheel means for supporting the plates.

2. A machine of the class described comprising a pair of upright side plates, a hood connecting the upper edges of the plates, a pair of spring arms fixed to each plate on the inner face thereof and diverging downwardly therefrom, oil pans mounted on the lower ends of the arms, a pair of bars pivoted on the forward portions of the plates and having axles intermediate their ends, wheels journalled on the axles, and means associated with the bars to hold them in adjusted position.

NILS T. A. NILSSON.